United States Patent [19]

Moore

[11] Patent Number: 5,211,489
[45] Date of Patent: May 18, 1993

[54] RADIAL SPLINE ASSEMBLY FOR ANTIFRICTION BEARINGS

[75] Inventor: Jerry H. Moore, Palm Beach Gardens, Fla.

[73] Assignee: The United States of America as represented by the Administrator of the National Aeronautics and Space Administration, Washington, D.C.

[21] Appl. No.: 957,128

[22] Filed: Oct. 7, 1992

[51] Int. Cl.$^5$ .................. F16C 43/04; F16C 19/52
[52] U.S. Cl. .................................. 384/585; 384/493; 384/537
[58] Field of Search ............... 384/493, 517, 537, 557, 384/585

[56] References Cited

U.S. PATENT DOCUMENTS

| | | | |
|---|---|---|---|
| 1,255,378 | 2/1918 | Beach | 384/537 |
| 3,326,613 | 6/1967 | Renker | 384/493 |
| 3,574,424 | 4/1971 | Hagemeister | 384/517 |
| 3,738,719 | 6/1973 | Langner | 384/517 |
| 4,213,660 | 7/1980 | Yasui et al. | 384/585 |
| 4,557,679 | 12/1985 | Mori et al. | 384/585 X |

*Primary Examiner*—Thomas R. Hannon
*Attorney, Agent, or Firm*—Robert L. Broad, Jr.; Guy M. Miller; John R. Manning

[57] ABSTRACT

An outer race carrier (52) is constructed for receiving an outer race (26) of an antifriction bearing assembly (10). The carrier (52) in turn is slidably fitted in an opening (57) of a support wall to accommodate slight axial movements of a shaft (14). A plurality of longitudinal splines (54) on the carrier are disposed to be fitted into matching slots (56) in the opening (57). A deadband gap (60) is provided between sides of the splines and slots, with a radial gap (62) at ends of the splines and slots and a gap (59) between the splines and slots sized larger than the deadband gap. With this construction, operational distortions (slope) of the support wall are accommodated by the larger radial gaps (62, 59) while the deadband gaps (60) maintain a relatively high springrate of the housing. Additionally, side loads applied to the shaft are distributed between sides of the splines and slots, distributing such loads over a larger surface area than a race carrier (28) of the prior art.

12 Claims, 3 Drawing Sheets

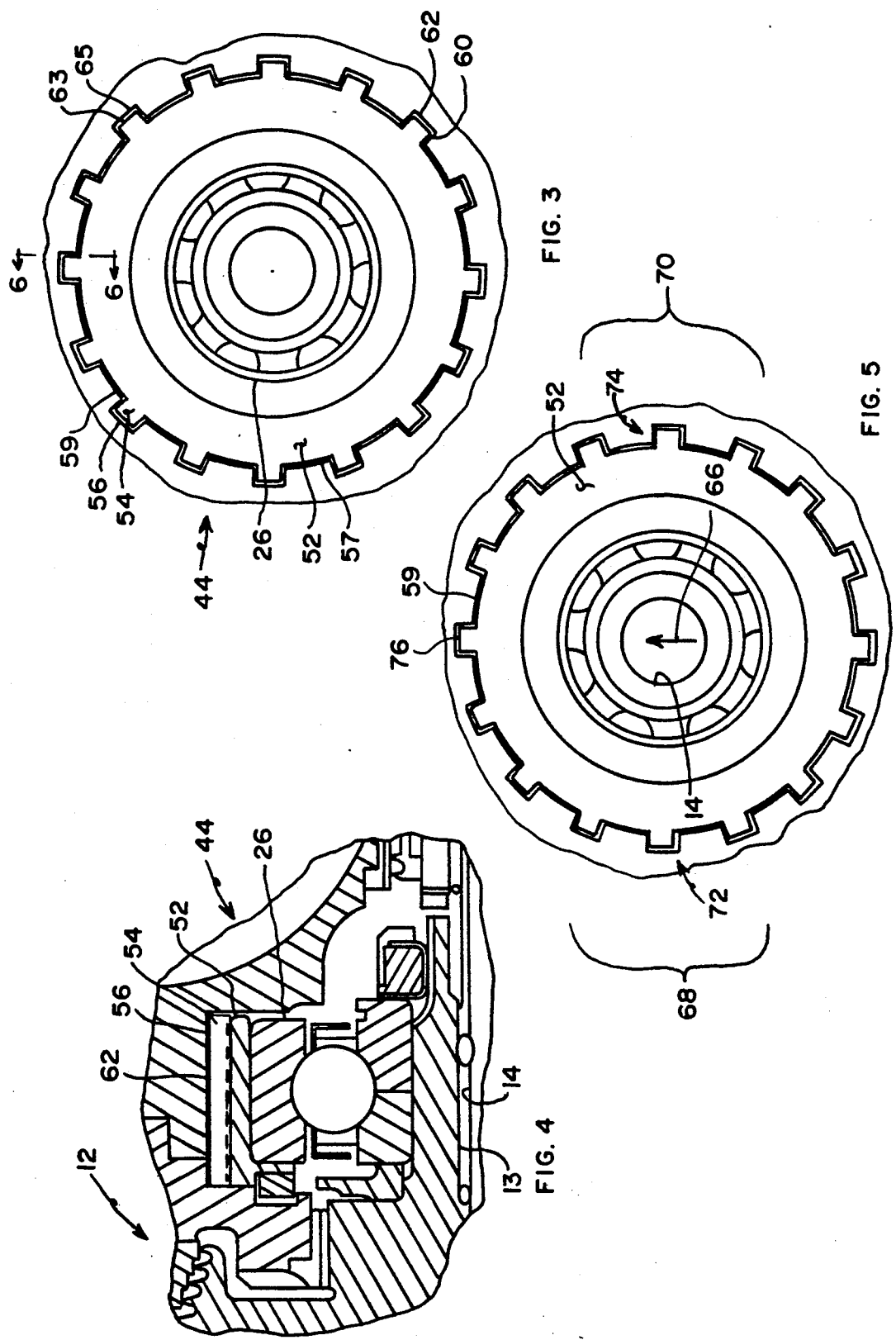

RADIAL SPLINE ASSEMBLY FOR ANTIFRICTION BEARINGS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

This invention relates generally to mounting assemblies for high-speed bearings and particularly to a mounting assembly for a high-speed ball bearing used in an Alternate Turbopump Design (ATD) of the Space Shuttle main engine.

BACKGROUND OF THE INVENTION

In the Space Shuttle main engine hydrogen and oxygen turbopumps, a shaft coupled between a turbine and a high volume pump is spun by the turbine at a high rate of speed, with the liquid hydrogen, or fuel pump, turning in excess of 37,000 rpm and the liquid oxygen, or oxidizer, pump turning at about 27,000 rpm. The shaft coupling the turbine section and the pump section transfers energy sufficient to pump liquid oxygen or liquid hydrogen at flow rates of several thousand gallons per minute to the engines. In the liquid oxygen turbopump, this shaft is rotatably supported by antifriction bearings, a roller bearing and ball bearing at one end of the shaft, and a single, larger ball bearing near the opposite end of the shaft. These bearings operate in a cryogenic environment with little or no lubricant, requiring liquid oxygen flow through the bearings in order to prevent them from being destroyed. The large ball bearing is provided with an inner race constructed of two annular portions each fixed, as by an interference fit, to an extension of a preburner impeller, in turn splined to the shaft, a cage to maintain separation of the balls of the bearing, and an outer race fixed, again, as by an interference fit, in an outer race bearing carrier fitted in an opening, or support configuration, in the turbopump housing.

In order to balance axial loads, or thrust, applied to the shaft, a system has been developed wherein small axial movements of the rotor and shaft due to turbine thrust are utilized to regulate a flow of liquid oxygen that in turn controls axial position of the rotor and shaft. This allowable axial movement of the shaft is facilitated at the single, large bearing in part by constructing the bearing to allow slight axial movement between the inner race and balls of the bearing. Additionally, a gap known as a deadband gap is provided between the outer race carrier within which the outer race is held, and the carrier support configuration interfacing the outer race carrier and the housing of the turbopump. This deadband gap provides a clearance within which the outer race carrier and outer race may axially move in order to accommodate axial movement of the shaft and is sized at about 0.002". With this gap sizing, springrate, which is a measure of rigidity of the support configuration, is maintained at a relatively high value, minimizing radial deflections of the support configuration. However, slope, or uneven radial distortions along the axis of the support configuration and outer race carrier due to fluid pressure against the turbopump housing adjacent the bearing, and occurring particularly when power level settings are changed, may bind the circular bearing carrier in the support configuration. This axial restraint may cause an overload condition of the bearing, resulting in bearing failure.

Another problem in the prior art is that, while a restraining shear pin prevents the outer race carrier from spinning in the housing support, dynamic tests have shown that torque applied to the outer race carrier occasionally exceeds the shear strength of the pin, resulting in the pin shearing and the outer race carrier being spun in its support. Further, flow of liquid oxygen through the bearing occasionally exceeds design parameters, which can apply unacceptable side loads on the ball bearing cage and cause the cage to incur damage. Any of the aforementioned problems may cause damage, necessitating expensive and timeconsuming repairs to the turbopump.

Accordingly, it is an object of this invention to provide an outer race carrier and support configuration therefor that desensitizes these components to bearing support springrate, bearing support operational slope, and excessive flow of liquid oxygen through the bearing.

SUMMARY OF THE INVENTION

A generally annular bearing carrier is constructed to support an outer race of a high-speed bearing, with a rotatable shaft extending through and tightly fixed to an inner race of the bearing. The carrier is provided with a plurality of splines on an outer circumference, with these splines generally parallel to the shaft. The carrier fits into an opening in a supporting wall, with mating slots in the circumference of the opening for receiving the splines of the carrier. With this construction, the carrier is less sensitive to slope distortions, which otherwise may bind the carrier in the opening, restraining it from movement.

BRIEF DESCRIPTION OF THE DRAWINGS

FIG. 3 is a planar view of a bearing and support of the present invention.

FIG. 4 is a cut-away view of a portion of the bearing and support of the present invention.

FIG. 4 is a cut-away view of a portion of the bearing and support of the present invention.

FIG. 5 is a planar view of the bearing and support configuration of the present invention showing displacement of the bearing carrier responsive to a side load.

DESCRIPTION OF THE PREFERRED EMBODIMENT

Figure 1:
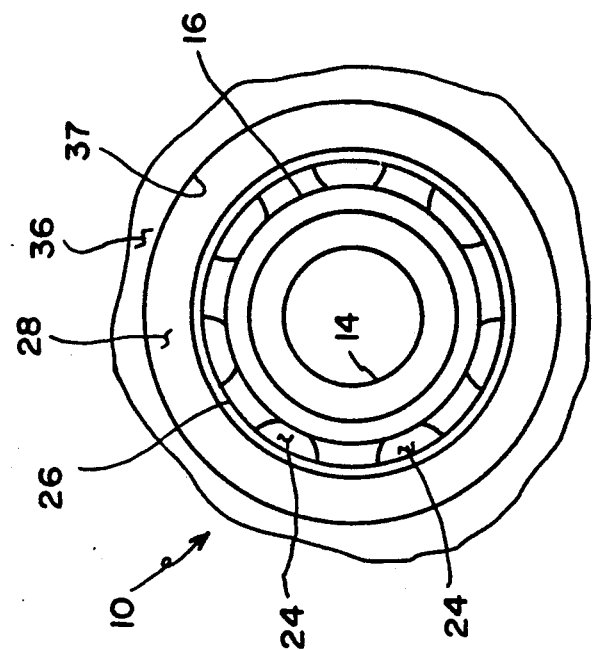
FIG. 1 is a planar view of a bearing and support of the prior art.
Figure 2:
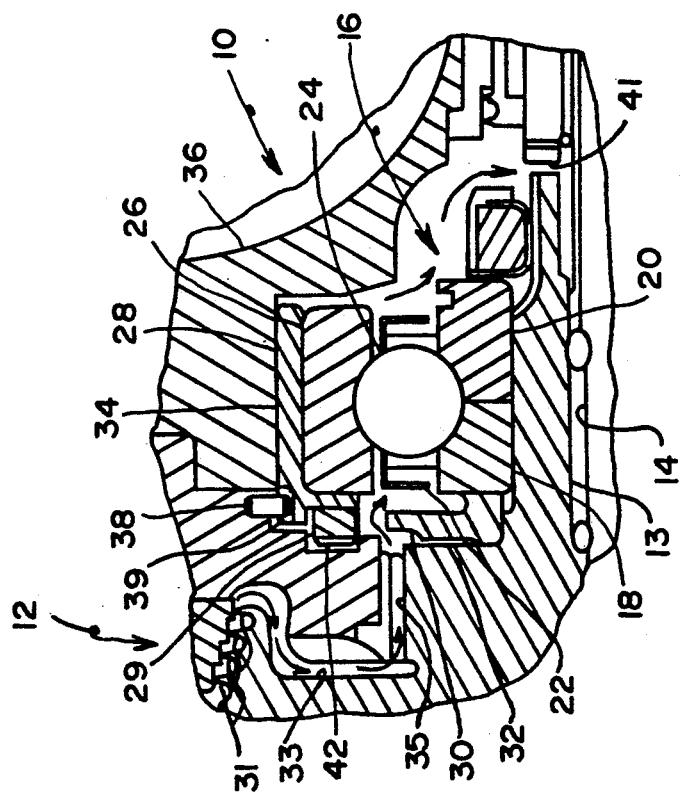
FIG. 2 is a cut-away view of a portion of the bearing and support of the prior art.

Referring initially to FIGS. 1 and 2, a ball bearing and support configuration 10 of the prior art is shown mounted near a preburner portion 12 of an alternate turbopump design (ATD) of the high pressure liquid oxygen turbopump of the Space Shuttel main engines. This bearing, in conjunction with a roller bearing and a smaller ball bearing at the opposite end of the shaft (not shown), supports a high speed shaft 14 that couples power from the turbine to the liquid oxygen pump. In this design of ball bearing and support configuration 10, an inner race 16 is mounted to an extension 13 of the impeller, as by an interference fit, with the impeller in turn fitted by splines to shaft 14, and fixed thereto by means not shown. Race 16 is constructed of portions 18 and 20 in order to facilitate assembly of the bearing. A cage 22 (FIG. 2) maintains separation of the balls 24 of the bearing, with an outer race 26 mounted in an outer race carrier 28. A torsion spring 29 biases outer race 26 to the right. During assembly of the shaft, a flow diverter 30 is abutted against shoulder 32 of impeller 13, with portion 18 of the inner race abutted against flow diverter 30, followed by cage 22, balls 24 and outer race 26. Race 26 is tightly mounted in carrier 28, as by interference fit, with carrier 28 in turn mounted in a support configuration, or circular opening, 34 of housing 36. As stated, a clearance or deadband 37 (FIG. 1) of about 0.002" is provided between carrier 28 and support 34, which gap 37 generally maintaining a clearance region for allowing slight axial movement of the shaft and impeller. A torque pin 38 (FIG. 2) is set between region 36 and a recess 39 in carrier 28 and prevents torque from shaft 14 applied to carrier 28 from spinning carrier 28 in the support configuration. During operation, liquid oxygen serves as a coolant, and flows past flow reducers 31 through channels 33 and 35 to bearing 10. The flow is diverted around flow diverter 30, which serves to prevent the flow of liquid oxygen from impinging directly on bearing cage 22, which could otherwise damage cage 22. After flowing through the bearing, the flow of liquid oxygen is routed through passageway 41 back into the main flow of liquid oxygen.

Referring now to FIGS. 3 and 4, a bearing and support configuration 44 of the present invention is contrasted to the above-described bearing and support configuration of the prior art. Here, outer race 26 of the bearing is tightly supported in a carrier 52 having radial splines 54 aligned generally parallel to shaft 14, with these splines fitting in matching slots 56 in opening 57 of the support configuration. Splines 54 and slots 56 are sized such as to provide about 0.002" deadband gap 60 (exaggerated in FIGS. 3 and 5) between sides of the splines and sides of the slots, with a radial gap 62 between ends 63 of splines 54 and floors 65 of slots 56 sized larger than gap 60, as will be described. Additionally, a radial gap 59 between splines and slots is also sized larger than gap 60 so the carrier cannot "bottom out" in the support configuration.

Figure 6:
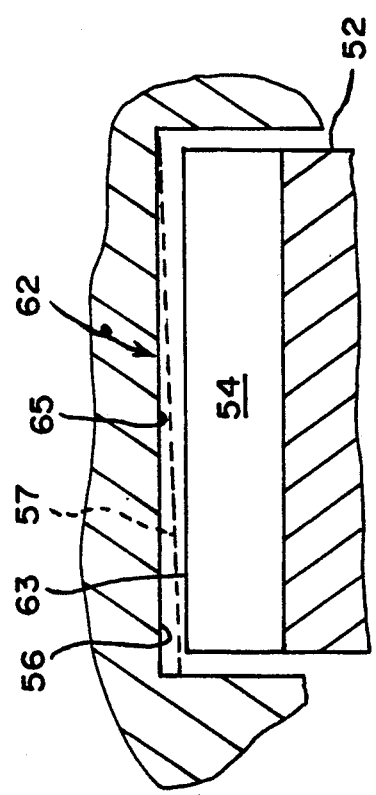
FIG. 6 is a sectional view taken along lines 6—6 of FIG. 3 and through a gap between sides of splines and sides of slots of the present invention and particularly illustrating a dotted line showing of a slope distortion.

In operation, side loads applied to shaft 14 results in radial movement of shaft 14 and carrier 52 in the direction of the side load until gap 60 between splines and slots situated normal to the side load closes until sides of the splines and sides of respective slots make contact, with the gap on the opposite side of the splines opening to about 0.004". For example, as seen in FIG. 5, a side load applied in the direction of arrow 66 causes movement of shaft 14 and carrier 52 in this direction until sides of splines generally within regions 68 and 70 make contact with facing sides of the respective slots. Of course, splines and slots 72 and 74, being normal to the side load, receive the greatest portion of the load, with splines and slots on both sides of splines and slots 72 and 74 bearing loads which are inverse with distance from splines and slots 72 and 74. With this splined construction, radial loads applied to shaft 14 are divided and distributed over opposed regions 68 and 70 generally normal to the side loads and on either side of shaft 14, which distribution presenting a much greater contact area between sides of the splines and slots, increasing springrate of the housing. This is in contrast to the circular configuration of the bearing carrier and support of the prior art, where radial side loads are concentrated in a small arc between the carrier and support and in the direction of the side loads. Additionally, as the gaps between sides of the splines and sides of the slots closes, gaps between opposite sides of the splines and slots opens to about 0.004", maintaining a gap between sides of the slots and sides of the splines at all times, as shown by splines and slots 72 and 74, so that axial freedom of movement for the shaft is maintained. Further, with this splined configuration, and as shown in FIG. 6, the bearing carrier and support configuration are desensitized to slope distortion because the radial gaps 62 between ends of the splines and floors of the slots and intermediate radial gaps 59 in the regions between splines and slots are sized greater than the gaps between the sides of the splines and facing sides of the slots. These radial gaps 62 and 59, sized larger than the 0.002" gap 60 between sides of the splines and slots, provide increased clearance for slope distortions, shown by dotted lines 57, than the 0.002" deadband gap 37 of the prior art. Thus, springrate of the support configuration is maintained by 0.002" gaps between sides of the splines and slots, while larger radial gaps 62 and 59 allow for slope distortions greater than 0.002" and caused by fluid pressure against the housing.

For varying stiffness of the radial springrate, the number and dimensions of the splines and slots may be varied. For example, where increased springrate stiffness is desired, the number of splines and slots may be increased and constructed of wider dimensions. Conversely, where less stiffness is desired, the splines and slots may be fewer and construction of narrower dimensions. Additionally, where there is a flow of coolant through the bearing, such as in the above-described application, the end gap between the individual splines and slots and gaps in the regions between splines and slots may be increased to permit more flow therethrough, with reduced flow through the bearing and corresponding reduced pressure against a cage of the bearing, or these gaps may be decreased to reduce such flow and increase coolant flow through the bearing. Further, due to the number of splines and slots and greater contact area between sides of spline and slots, this design provides greater resistance against torque applied to the carrier from the shaft such that shear pins are not needed.

While the above invention has been described in terms of splines being provided on an outer race carrier, it is evident that splines may be provided directly on an outer race of a bearing. Here, the outer race is fitted into a support configuration having slots as described above to receive the splines of the outer race. The deadband gap may be sized from an interference fit to a gap of several thousandths of an inch, with the end gap between ends of the splines and floors of the grooves being sized larger than the deadband gap in order to accommodate slope distortions while maintaining high springrate. This embodiment functions as described above to distribute side loads applied to the inner race of the bearing along surfaces between sides of the splines and sides of the grooves, with these loads on the splines and grooves being normal to the direction of side loads applied to the inner race.

Having thus described my invention and the manner of its use, it is apparent that incidental changes and modifications may be made thereto that fairly all within the scope of the following appended claims, wherein I claim:

1. A support for a rotating load bearing member comprising:
   an antifriction bearing having annular inner and outer races;
   a rotatable shaft extending through said inner race;
   a plurality of splines disposed about a periphery of said outer race, said splines extending generally parallel with said shaft;
   a support wall having an opening for supporting said outer race;
   a plurality of slots disposed along an inner circumference of said opening, said slots generally parallel with said shaft, for receiving said splines;
   first selected clearance defined by sides of said splines and sides of said slots; and
   second selected clearances greater than said first selected clearance and defined by outer and intermediate radial portions of said splines and facing regions of said intermediate portions and said slots, whereby radial movement of said shaft is limited by contact between sides of said splines and sides of said slots, and slope distortion of said opening greater than said first selected clearances are accommodated by said second selected clearances.

2. A support as set forth in claim 1 wherein said outer race is circular and fixed in an annular outer race carrier, and said splines are disposed about a periphery of said outer race carrier.

3. A support as set forth in claim 2 wherein rotational torque applied to said bearing is distributed against said sides of said splines and said sides of said slots, preventing said outer race from rotating.

4. A support as set forth in claim 2 wherein said first clearance is about 0.002".

5. A support as set forth in claim 1 wherein said antifriction bearing is a ball bearing.

6. A support as set forth in claim 1 wherein coolant flows through said bearing, with a portion of said coolant flowing through said first and second clearances.

7. A bearing carrier disposed to support an outer race of an antifriction bearing in slidable relation within a support configuration, with a rotatable shaft extending through an inner race of said bearing, said bearing carrier and support configuration comprising:
   a generally annular ring-shaped member within which said outer race is fixed;
   a plurality of splines in an outer circumference of said ring-shaped member, said splines generally parallel with said shaft; and
   a like plurality of slots in said support configuration for receiving said splines, wherein sides of said splines and facing sides of said slots define first clearances, and intermediate and outermost radial portions of said splines and facing regions of said slots define second clearances, whereby side loads applied to said shaft are distributed between said sides of said splines and said sides of said slots positioned generally normal to said side loads, and slope distortions between said support configuration and said annular ring-shaped member are accommodated by said second clearances, maintaining said slidable relation of said outer race.

8. A bearing carrier as set forth in claim 7 wherein said first clearance are about 0.002".

9. A bearing carrier as set forth in claim 8 wherein said second clearances are larger than said first clearances.

10. A bearing carrier as set forth in claim 9 wherein sides of said splines and said slots distribute rotational torque applied to said bearing, preventing said bearing carrier and outer race from rotating.

11. A bearing carrier as set forth in claim 10 wherein coolant flows through said bearing, with a portion of the coolant flowing through said first and second clearances.

12. An antifriction bearing having a flow of coolant therethrough nd support therefor disposed for supporting a rotating shaft, in combination comprising;
   a generally annular outer race carrier for receiving an outer race of said bearing;
   a support wall having a generally circular opening for supporting said outer race carrier;
   a plurality of splines disposed about a periphery of said outer race carrier; and
   a like plurality of slots about an inner circumference of said opening, said slots disposed for slidably receiving said splines, said splines and said slots defining a first clearance of about 0.002" between sides of said splines and sides of said slots, and a second clearance defined by radially outer regions of said splines and facing, radially outermost regions of said slots, said second clearance being generally greater than said first clearance and disposed for providing a flow path for a portion of said coolant flow and accommodating slope distortions of said opening without restraining said annular outer race carrier, said first clearance for distributing side loads applied to said shaft on sides of said splines and sides of said slots disposed generally normal to said side loads and for preventing rotational torque applied to said bearing from rotating said outer race and said outer race carrier.

* * * * *